(12) United States Patent
Hsieh

(10) Patent No.: US 10,281,097 B2
(45) Date of Patent: May 7, 2019

(54) FLOOR LAMP AND SUPPORT ROD ASSEMBLY THEREOF

(71) Applicant: HABITEX CORPORATION, Taipei (TW)

(72) Inventor: Pei-Lin Hsieh, Taipei (TW)

(73) Assignee: HABITEX CORPORATION, Taipei (TW)

( * ) Notice: Subject to any disclaimer, the term of this patent is extended or adjusted under 35 U.S.C. 154(b) by 258 days.

(21) Appl. No.: 15/498,129

(22) Filed: Apr. 26, 2017

(65) Prior Publication Data

US 2018/0313502 A1 Nov. 1, 2018

(51) Int. Cl.
| F21S 6/00 | (2006.01) |
| F16B 7/10 | (2006.01) |
| F16M 11/28 | (2006.01) |

(52) U.S. Cl.
CPC .............. F21S 6/005 (2013.01); F16B 7/105 (2013.01); F16M 11/28 (2013.01)

(58) Field of Classification Search
CPC .. F21S 6/005; F21S 6/00; F21S 6/004; F16M 11/28; F16M 11/26; F16M 11/24; F16B 7/105
See application file for complete search history.

(56) References Cited

U.S. PATENT DOCUMENTS

| 1,408,128 | A | * | 2/1922 | Neahr | ....................... | A47F 5/04 |
| | | | | | | 211/26 |
| 1,613,382 | A | * | 1/1927 | Clarke | ..................... | F21S 6/005 |
| | | | | | | 211/196 |
| 1,977,378 | A | * | 10/1934 | Doane | ..................... | F21V 21/12 |
| | | | | | | 362/410 |
| 5,149,149 | A | * | 9/1992 | Wu | ....................... | F16B 7/0413 |
| | | | | | | 285/396 |
| 6,357,896 | B1 | * | 3/2002 | Yeh | ......................... | E04H 12/18 |
| | | | | | | 362/410 |
| 2010/0155549 | A1 | * | 6/2010 | Robinson | ............... | F16M 11/10 |
| | | | | | | 248/183.1 |
| 2017/0233996 | A1 | * | 8/2017 | Abernathy | ............ | E04B 1/2403 |
| | | | | | | 52/698 |

* cited by examiner

*Primary Examiner* — Anita M King
(74) *Attorney, Agent, or Firm* — Hamre, Schumann, Mueller & Larson, P.C.

(57) ABSTRACT

A floor lamp includes a lamp base, a lamp holder module, and a support rod assembly including a bottom support rod having a bottom mounting end portion connected to the lamp base, a connecting end portion, and a through hole; a top support rod having a top mounting end portion connected to the lamp holder module, a connecting end portion, and a through hole; and at least one coupling member having two coupling holes respectively formed in two opposite coupling end portions thereof. Two fixing members are inserted fixedly and respectively into an aligned one of the through hole in the bottom support rod and one of the coupling holes and another aligned one of the through hole in the top support rod and the other coupling hole.

9 Claims, 4 Drawing Sheets

FLOOR LAMP AND SUPPORT ROD ASSEMBLY THEREOF

FIELD

The disclosure relates to a floor lamp, more particularly to a floor lamp and a support rod assembly thereof that can permit a user to assemble the floor lamp by himself or herself.

BACKGROUND

A conventional floor lamp available in the market is usually provided with a support rod assembly to facilitate transport thereof and to permit a user to assemble the floor lamp by himself or herself. However, the conventional support rod assembly is assembled in a threaded manner, so that skewing of screws may occur during assembly thereof, thereby rendering the conventional support rod assembly unstable.

SUMMARY

Therefore, an object of the present disclosure is to provide a floor lamp and a support rod assembly thereof that is capable of overcoming the aforesaid drawback of the prior art.

According to one aspect of this disclosure, a support rod assembly of a floor lamp, which includes a lamp base, a lamp holder module and a cable, comprises a bottom support rod, a top support rod, at least one coupling member and a plurality of fixing members. The bottom support rod is hollow, is configured for extension of the cable therethrough, and has a bottom mounting end portion configured to connect with the lamp base, a connecting end portion opposite to the bottom mounting end portion, and a through hole formed in the connecting end portion. The top support rod is hollow, is configured for extension of the cable therethrough, and has a top mounting end portion configured to connect with the lamp holder module, a connecting end portion opposite to the top mounting end portion, and a through hole formed in the connecting end portion of the top support rod. The at least one coupling member is hollow, is configured for extension of the cable therethrough, and has two opposite coupling end portions, and two coupling holes respectively formed in the coupling end portions. Each coupling end portion is insertable into the connecting end portion of one of the bottom and top support rods until each coupling hole is aligned with the through hole in the connecting end portion of the one of the bottom and top support rods. Two of the fixing members are inserted fixedly and respectively into an aligned one of the through hole in the bottom support rod and one of the coupling holes and another aligned one of the through hole in the top support rod and the other one of the coupling holes.

According to another aspect of this disclosure, a floor lamp comprises a lamp base supported on the ground, a lamp holder module located above the lamp base, a support rod assembly and a cable. The support rod assembly supports the lamp holder module on the lamp base and includes a bottom support rod, a top support rod, at least one coupling member and a plurality of fixing members. The bottom support rod is hollow and has a bottom mounting end portion connected to the lamp base, a connecting end portion opposite to the bottom mounting end portion, and a through hole formed in the connecting end portion. The top support rod is hollow and has a top mounting end portion connected to the lamp holder module, a connecting end portion opposite to the top mounting end portion, and a through hole formed in the connecting end portion of the top support rod. The at least one coupling member is hollow and has two opposite coupling end portions, and two coupling holes respectively formed in the coupling end portions. Each coupling end portion is inserted into the connecting end portion of one of the bottom and top support rods until each coupling hole is aligned with the through hole in the connecting end portion of the one of the bottom and top support rods. Two of the fixing members are inserted fixedly and respectively into an aligned one of the through hole in the bottom support rod and one of the coupling holes and another aligned one of the through hole in the top support rod and the other one of the coupling holes. The cable has one end electrically connected to the lamp base and another end extending through the bottom support rod, the at least one coupling member and the top support rod to electrically connect with the lamp holder module.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
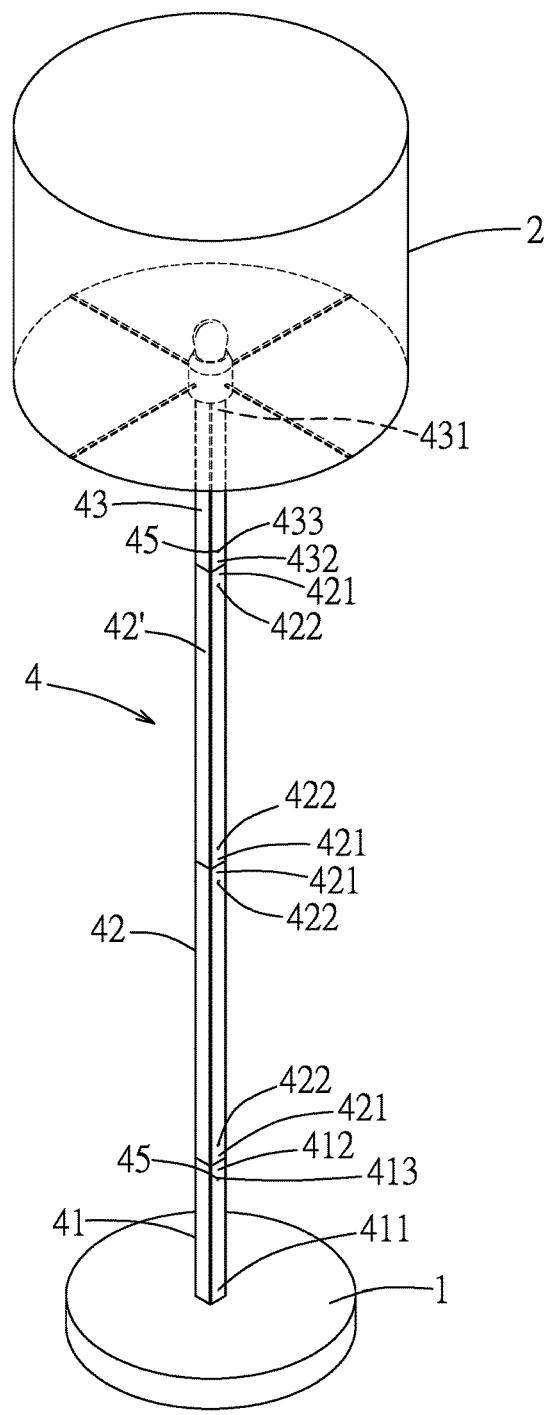
FIG. 1 is a perspective view of a floor lamp according to the embodiment of the present disclosure.
Figure 2:
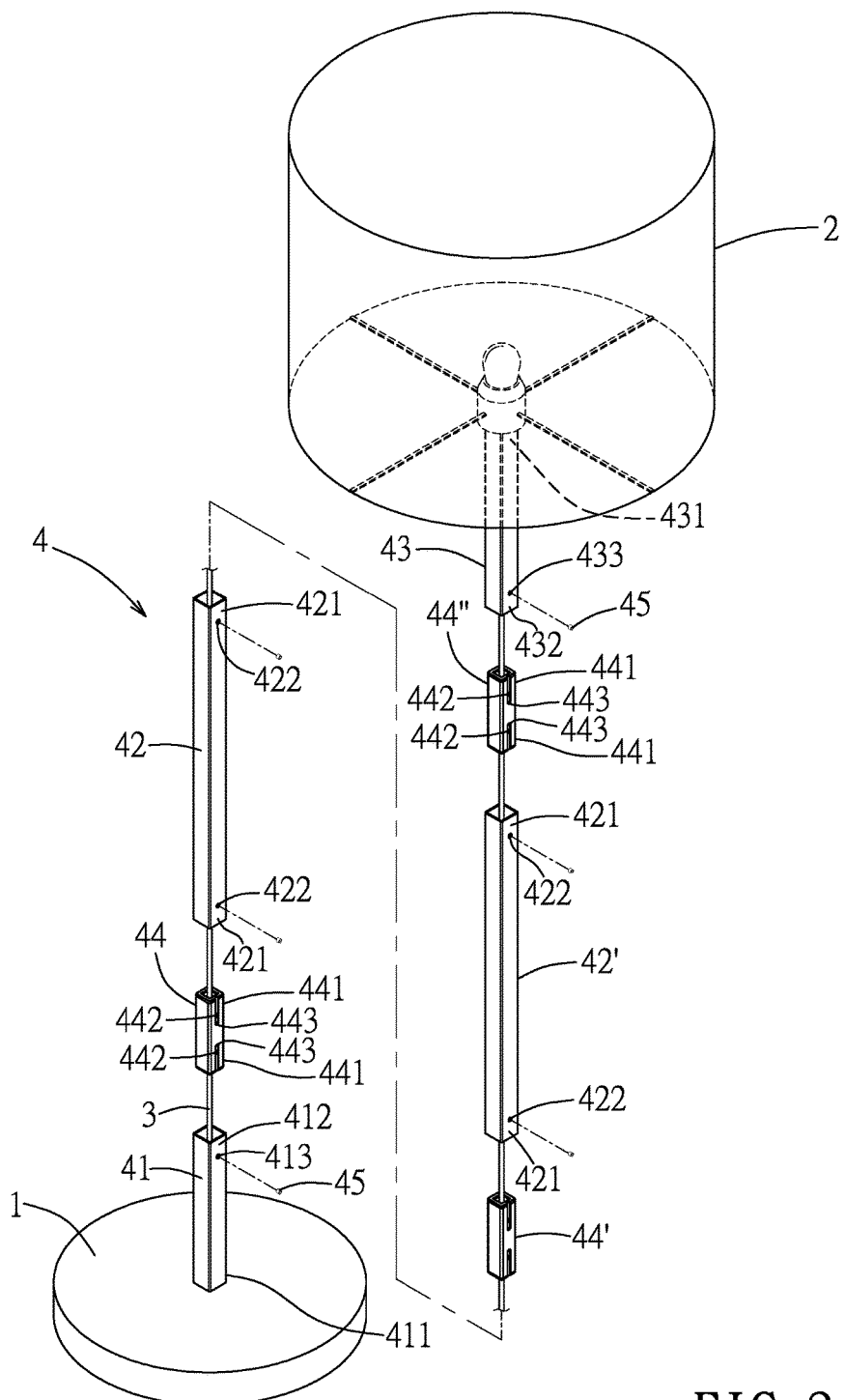
FIG. 2 is an exploded perspective view of the floor lamp of the embodiment.
Figure 3:
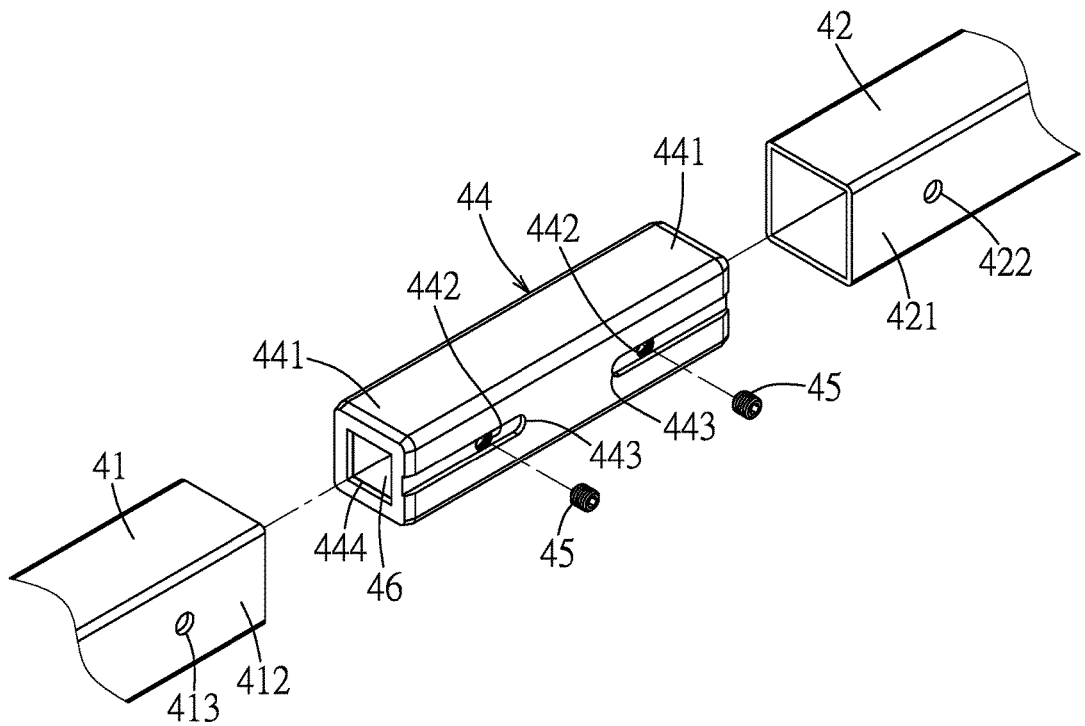
FIG. 3 is an exploded perspective view of a bottom support rod, a coupling member and an intermediate support rod of a support rod assembly of the embodiment.
Figure 4:
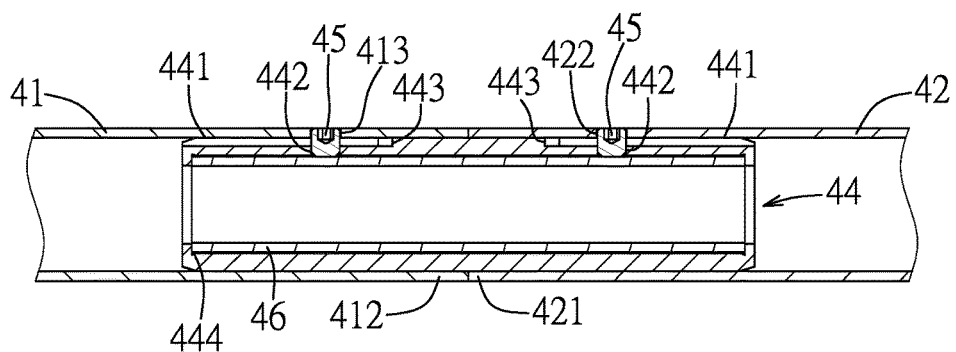
FIG. 4 is an assembled sectional view of FIG. 3.

Referring to FIGS. 1 to 4, a floor lamp according to the embodiment of the present disclosure is shown to comprise a lamp base 1, a lamp holder module 2, a cable 3 and a support rod assembly 4.

The lamp base 1 is supported on the ground. The lamp holder module 2 is located above the lamp base 1 for providing illumination. An electrical wire for connection to a power source and a control switch to operate the lamp holder module 2 may be provided on the lamp base 1, but is not limited thereto.

The support rod assembly 4 supports the lamp holder module 2 on the lamp base 1, and includes a bottom support rod 41, two intermediate support rods 42, 42', a top support rod 43, three coupling members 44, 44', 44", a plurality of fixing members 45, and three tubular reinforcing members 46. In this embodiment, each of the bottom support rod 41, the intermediate support rod 42, 42', the coupling member 44, 44', 44" and the top support rod 43 is a hollow rectangular rod.

The bottom support rod 41 has a bottom mounting end portion 411 connected to the lamp base 1, a connecting end portion 412 opposite to the bottom mounting end portion 411, and a through hole 413 formed in the connecting end portion 412. The bottom support rod 41 is mounted upright on the lamp base 1 through the connection of the bottom mounting end portion 411 with the lamp base 1.

Each of the intermediate support rods 42, 42' has two opposite connecting end portions 421, and two through holes 422 respectively formed in the connecting end portions 421.

The top support rod 43 has a top mounting end portion 431 connected to the lamp holder module 2, a connecting end portion 432 opposite to the top mounting end portion 431, and a through hole 433 formed in the connecting end portion 432.

Each coupling member 44, 44', 44" has two opposite coupling end portions 441, and two coupling holes 442 respectively formed in the coupling end portions 441. In this embodiment, the coupling holes 442 are threaded holes (see FIG. 3). Each coupling member 44, 44', 44" may have a shape tapering from a central portion towards two opposite ends thereof in other embodiments.

The coupling member 44 couples the intermediate support rod 42 and the bottom support rod 41. The coupling end portions 441 of the coupling member 44 are inserted into the connecting end portion 412 of the bottom support rod 41 and one of the connecting end portions 421 of the intermediate support rod 42 until the coupling holes 442 are respectively aligned with the through holes 413, 422 in the connecting end portion 412 and the one of the connecting end portions 421. One of the fixing members 45 is then inserted through the through hole 413 to threadedly engage with the aligned coupling hole 442 in one of the coupling end portions 441 of the coupling member 44, and a second one of the fixing members 45 is inserted through the through hole 422 in the one of the connecting end portions 421 to threadedly engage with the aligned coupling hole 442 in the other coupling end portion 441 of the coupling member 44, thereby fixedly interconnecting the bottom support rod 41 and the intermediate support rod 42.

The coupling member 44' couples the two intermediate support rods 42, 42'. The coupling end portions 441 of the coupling member 44' are inserted into corresponding connecting end portions 421 of the intermediate support rods 42, 42' until the coupling holes 442 in the coupling member 44' are respectively aligned with the through holes 422 in the corresponding connecting end portions 421. A third fixing member 45 is then inserted through the through hole 422 in the connecting end portion 421 of the intermediate support rod 42 which is distal from the bottom support rod 41 so as to threadedly engage with the aligned coupling hole 442 in one of the coupling end portions 441 of the coupling member 44', and a fourth fixing member 45 is inserted through the through hole 422 in the connecting end portion 421 of the intermediate support rod 42' which is proximate to the intermediate support rod 42 so as to threadedly engage with the aligned coupling hole 442 in the other coupling end portion 441 of the coupling member 44', thereby fixedly interconnecting the intermediate support rods 42, 42'.

The coupling member 44" couples the intermediate support rod 42' and the top support rod 43. The coupling end portions 441 of the coupling member 44" are inserted into the connecting end portion 432 of the top support rod 43 and the connecting end portion 421 of the intermediate support rod 42' which is distal from the intermediate support rod 42 until the coupling holes 442 in the coupling member 44" are respectively aligned with the through holes 433, 422 in the connecting end portion 432 of the top support rod 43 and the connecting end portion 421 of the intermediate support rod 42' which is distal from the intermediate support rod 42. A fifth fixing member 45 is then inserted through the through hole 433 in the connecting end portion 432 of the top support rod 43 to threadedly engage with the aligned coupling hole 442 in one of the coupling end portions 441 of the coupling member 44", and a sixth fixing member 45 is inserted through the through hole 422 in the connecting end portion 421 of the intermediate support rod 42' which is distal from the intermediate support rod 42 so as to threadedly engage with the aligned coupling hole 442 in the other coupling end portion 441 of the coupling member 44", thereby fixedly interconnecting the intermediate support rod 42' and the top support rod 43.

It should be noted herein that an outer end of each of the fixing members 45 is flush with an outer wall surface of a corresponding one of the bottom support rod 41, the intermediate support rods 42, 42' and the top support rod 43, so that the fixing members 45 are not easily perceived, thereby enhancing the aesthetic appearance of the support rod assembly 4.

In this embodiment, the intermediate support rod 42 and the bottom support rod 41 can be interconnected through the coupling member 44 and fixed to each other through two of the fixing members 45, the intermediate support rods 42, 42' can be interconnected through the coupling member 44' and fixed to each other through another two of the fixing members 45, and the intermediate support rod 42' and the top support rod 43 can be interconnected through the coupling member 44" and fixed to each other through yet another two of the fixing members 45.

Further, the support rod assembly 4 of this embodiment includes two intermediate support rods 42, 42' connected between the bottom and top support rods 41, 43. However, in other alternative embodiments, the intermediate support rods may be dispensed with, or the support rod assembly 4 may include only one or more than three intermediate support rods 42 connected between the bottom and top support rods 41, 43. In other words, the length of the support rod assembly 4 may be adjusted according to the actual requirements. For example, if the user desires to shorten the length of the support rod assembly 4, the bottom and top support rods 41, 43 may be directly connected to each other, or only one intermediate support rod 42 may be connected between the bottom and top support rods 41, 43. If the user desires to prolong the length of the support rod assembly 4, three or more of the intermediate support rods 42 may be connected between the bottom and top support rods 41, 43 using a corresponding number of the coupling members 44.

Each coupling member 44, 44', 44" further has two elongated grooves 443 that are formed in an outer wall surface thereof, that correspond in position to the coupling end portions 441, and that extend toward each other along the length thereof. The coupling holes 442 are respectively formed in groove bottom walls of the grooves 443. The grooves 443 can prevent the burrs of the coupling holes 442 from affecting the assembly of the support rod assembly 4 and from interfering with the fastening operation of the fixing members 45. Further, each coupling member 44, 44', 44" defines a mounting space 444 therein.

The reinforcing members 46 are made of metal, and are respectively received in the mounting spaces 444 of the coupling members 44, 44', 44". An inner peripheral surface of each reinforcing member 46 abuttingly contacts an inner peripheral surface of the respective coupling member 44, 44', 44". The reinforcing members 46 can respectively strengthen the structures of the coupling members 44, 44', 44".

The cable 3 has one end electrically connected to the lamp base 1, and another end extending through the bottom support rod 41, the reinforcing member 46 embedded in the coupling member 44, the intermediate support rod 42, the reinforcing member 46 embedded in the coupling member 44', the intermediate support rod 42', the reinforcing member 46 embedded in the coupling member 44", and the top support rod 43 to electrically connect with the lamp holder module 2. With the reinforcing members 46 being embedded in the respective coupling members 44, 44', 44", the reinforcing members 46 can be prevented from scratching the cable 3.

Additionally, the assembly method of the support rod assembly 4 of this embodiment can resolve the problems associated with the conventional support rod assembly which is assembled in a threaded manner.

Figure 5:
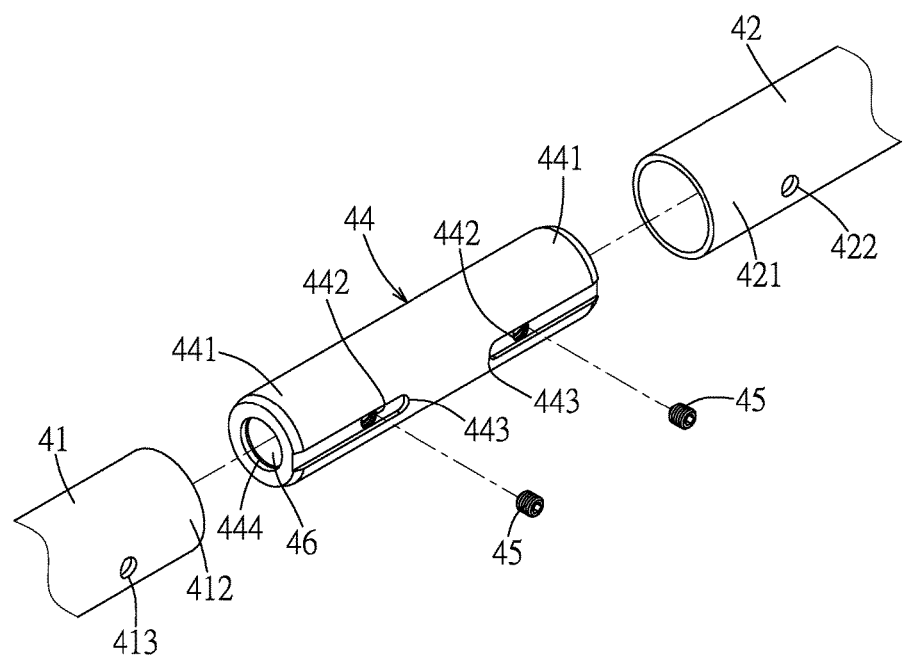
FIG. 5 is a view similar to FIG. 3, but illustrating alternative forms of the bottom support rod, the coupling member and the intermediate support rod of the support rod assembly.

FIG. 5 illustrates alternative forms of the bottom support rod 41, the coupling member 44 and the intermediate support rod 42 of the support rod assembly 4. In this case, each of the bottom support rod 41, the intermediate support rod 42, the top support rod (not shown) and the coupling member 44 is a circular rod.

In summary, through cooperation among the connecting end portions 412, 421, 432 of the bottom support rod 41, the intermediate support rods 42, 42' and the top support rod 43 with the coupling end portions 441 of the coupling members 44, 44', 44", and through the insertion of each fixing member 45 through the through hole 413, 422, 432 in each of the bottom support rod 41, intermediate support rod 42, 42' and the top support rod 43 and threadedly engaging the aligned coupling hole 442 in one of the coupling end portions 441 of the corresponding coupling member 44, 44', 44", the support rod assembly 4 of this disclosure can be easily assembled without using threaded engagement between the support rods thereof. Thus, the problem of skewing of screws encountered in the conventional support rod assembly can be eliminated. Further, the length of the support rod assembly 4 of this disclosure can be adjusted according to the requirements.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A support rod assembly of a floor lamp which includes a lamp base, a lamp holder module and a cable, said support rod assembly comprising:
    a bottom support rod that is hollow, that is configured for extension of the cable therethrough, and that has a bottom mounting end portion configured to connect with the lamp base, a connecting end portion opposite to said bottom mounting end portion, and a through hole formed in said connecting end portion;
    a top support rod that is hollow, that is configured for extension of the cable therethrough, and that has a top mounting end portion configured to connect with the lamp holder module, a connecting end portion opposite to said top mounting end portion, and a through hole formed in said connecting end portion of said top support rod;
    at least one coupling member that is hollow, that is configured for extension of the cable therethrough, and that has two opposite coupling end portions, and two coupling holes respectively formed in said coupling end portions, each of said coupling end portions being insertable into said connecting end portion of one of said bottom and top support rods until each of said coupling holes is aligned with said through hole in said connecting end portion of said one of said bottom and top support rods; and
    a plurality of fixing members, two of which are inserted fixedly and respectively into an aligned one of said through hole in said bottom support rod and one of said coupling holes and another aligned one of said through hole in said top support rod and the other one of said coupling holes.

2. The support rod assembly as claimed in claim 1, wherein:
    said at least one coupling member includes a plurality of coupling members, and said support rod assembly further comprises at least one intermediate support rod that is hollow, that is configured for extension of the cable therethrough, and that has two opposite connecting end portions, and two through holes respectively formed in said connecting end portions of said at least one intermediate support rod;
    each of said coupling end portions of one of said coupling members is insertable into said connecting end portion of one of said bottom support rod and said at least one intermediate support rod until each of said coupling holes is aligned with said through hole in said connecting end portion of said one of said bottom support rod and said at least one intermediate support rod;
    each of said coupling end portions of the other one of said coupling members is insertable into one of said connecting end portion of said at least one intermediate support rod which is distal from said bottom support rod and said connecting end portion of said top support rod until each of said coupling holes is aligned with said through hole in said one of said connecting end portion of said at least one intermediate support rod which is distal from said bottom support rod and said connecting end portion of said top support rod;
    two of said fixing members are inserted fixedly and respectively into an aligned one of said through hole in said bottom support rod and one of said coupling holes in said one of said coupling members and another aligned one of said through hole in said at least one intermediate support rod and the other one of said coupling holes in said one of said coupling members; and
    another two of said fixing members are inserted fixedly and respectively into an aligned one of said through hole in said at least one intermediate support rod and one of said coupling holes in said other one of said coupling members and another aligned one of said through hole in said top support rod and the other one of said coupling holes in said other one of said coupling members.

3. The support rod assembly as claimed in claim 2, wherein said at least one intermediate support rod includes two intermediate support rods, and a third one of said coupling members is connected between said intermediate support rods.

4. The support rod assembly as claimed in claim 2, wherein an outer end of each of said fixing members is flush with an outer wall surface of a corresponding one of said bottom support rod, said at least one intermediate support rod and said top support rod.

5. The support rod assembly as claimed in claim 2, wherein each of said coupling members further has two elongated grooves that are formed in an outer wall surface thereof, that correspond in position to said coupling end portions, and that extend toward each other along the length thereof, said coupling holes being respectively formed in groove bottom walls of said elongated grooves.

6. The support rod assembly as claimed in claim 2, wherein each of said coupling members defines a mounting space therein, and said support rod assembly further comprises a plurality of tubular reinforcing members each of which is received in said mounting space of a respective one of said coupling members, an inner peripheral surface of each of said tubular reinforcing members abuttingly contacting an inner peripheral surface of the respective one of said coupling members.

7. The support rod assembly as claimed in claim 2, wherein each of said bottom support rod, said at least one intermediate support rod, said top support rod and said coupling members is a rectangular rod.

8. The support rod assembly as claimed in claim 1, wherein each of said bottom support rod, said at least one intermediate support rod, said top support rod and said coupling members is a circular rod.

9. A floor lamp comprising:
- a lamp base supported on the ground;
- a lamp holder module located above said lamp base;
- a support rod assembly supporting said lamp holder module on said lamp base and including
  - a bottom support rod that is hollow and that has a bottom mounting end portion connected to said lamp base, a connecting end portion opposite to said bottom mounting end portion, and a through hole formed in said connecting end portion,
  - a top support rod that is hollow and that has a top mounting end portion connected to said lamp holder module, a connecting end portion opposite to said top mounting end portion, and a through hole formed in said connecting end portion of said top support rod,
  - at least one coupling member that is hollow and that has two opposite coupling end portions, and two coupling holes respectively formed in said coupling end portions, each of said coupling end portions being inserted into said connecting end portion of one of said bottom and top support rods until each of said coupling holes is aligned with said through hole in said connecting end portion of said one of said bottom and top support rods, and
  - a plurality of fixing members, two of which are inserted fixedly and respectively into an aligned one of said through hole in said bottom support rod and one of said coupling holes and another aligned one of said through hole in said top support rod and the other one of said coupling holes; and
- a cable having one end electrically connected to said lamp base and another end extending through said bottom support rod, said at least one coupling member and said top support rod to electrically connect with said lamp holder module.

\* \* \* \* \*